United States Patent [19]

Fields

[11] 4,220,666
[45] Sep. 2, 1980

[54] SUCROSE-INVERT SUGAR PROTEIN PRODUCT AND METHOD OF MANUFACTURE

[75] Inventor: Murray E. Fields, Tempe, Ariz.

[73] Assignee: Desert Merchandising, Inc., Tempe, Ariz.

[21] Appl. No.: 874,949

[22] Filed: Feb. 3, 1978

Related U.S. Application Data

[63] Continuation-in-part of Ser. No. 729,832, Oct. 4, 1976, abandoned, and a continuation-in-part of Ser. No. 841,944, Oct. 13, 1977, abandoned.

[51] Int. Cl.² ............................ A23J 3/00; A23L 1/09
[52] U.S. Cl. ........................................ 426/62; 426/72; 426/285; 426/311; 426/656; 426/658; 426/454
[58] Field of Search .................. 426/62, 72, 285, 311, 426/588, 656, 658, 660, 454

[56] References Cited

U.S. PATENT DOCUMENTS

| | | | |
|---|---|---|---|
| 3,097,947 | 7/1963 | Kemmerer | 426/72 X |
| 3,607,310 | 9/1971 | Carter, Jr. | 426/311 |
| 3,780,185 | 12/1973 | Fields | 426/72 |

OTHER PUBLICATIONS

Fredericks, C., et al., "Low Blood Sugar and You", Grosset & Dunlap, N.Y. 1969, pp. 38 and 85.

*Primary Examiner*—Robert A. Yoncoskie
*Attorney, Agent, or Firm*—Blakely, Sokoloff, Taylor & Zafman

[57] ABSTRACT

This invention is directed to a nutrition composition suitable for human use, especially as a dietary supplement for obese and/or diabetic persons. The main composition includes about 5–90% of sugar hydrolyzable to glucose and/or fructose; about 5–90% of glucose and/or fructose; about 0.5–60% of dietary protein; and about 0.5–10% of edible yeast. Optionally one or more B Vitamins are included. Another composition includes glucose and/or fructose, about 60–80%, and dietary protein, about 20–40%, and optionally one or more B Vitamins. Each of the named components in each composition total to 100%.

9 Claims, 1 Drawing Figure

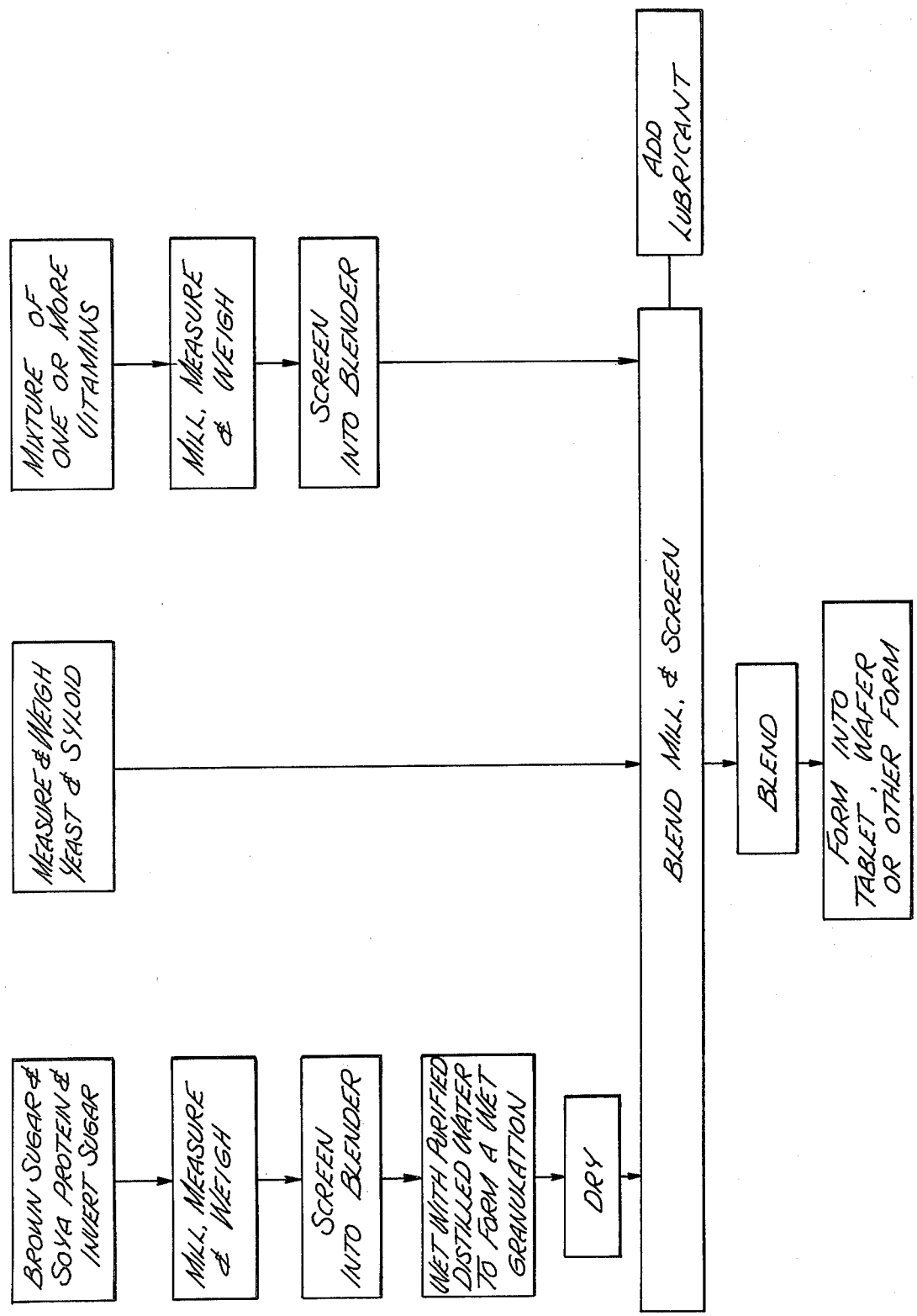

SUCROSE-INVERT SUGAR PROTEIN PRODUCT AND METHOD OF MANUFACTURE

CROSS-REFERENCE TO RELATED APPLICATIONS

This is a continuation-in-part of each of my copending applications Ser. No. 729,832, filed Oct. 4, 1976, now abandoned and of Ser. No. 841,944, filed Oct. 13, 1977, now abandoned Ser. No. 841,944 is a continuation-in-part of said Ser. No. 729,832.

BACKGROUND OF THE INVENTION

1. Field of the Invention

This invention relates to nutrition compositions suitable for human use and to method of manufacture thereof. Particularly, the inventions relates to compositions that supplement the diet needs of persons having blood sugar level problems and/or curb of the appetite problems, such as obese persons and diabetic persons or persons having both problems simultaneously.

2. Description of the Prior Art

Fields U.S. Pat. No. 3,780,185 discloses a composition of matter comprising dried honey, vitamins, minerals, sucrose, glucose and fructose. It is designed as a food supplement rendering the nutritional value of honey. The addition of the vitamins is to fortify nutritionally the honey product as a food.

Kemmerer U.S. Pat. No. 3,097,947 relates to a nutritional feeding program aimed at a reducing diet. One-half pound of the product disclosed is designed to yield 100 percent of the U.S. Recommended Daily Allowance of vitamins and minerals recommended by the Food and Nutrition Board of the National Research Council publication 589, revises 1958 to supply protein, carbohydrates and fat adequate to maintain health while on a reduced caloric intake. Sucrose is the recommended source of sugar to be used although the sugars in the hexose group are mentioned.

Zellers U.S. Pat. No. 2,512,537 discloses a means for rendering vitamins, minerals, medicine, protein and other nutrients palatable, this accomplished by using suitable binders such as molasses and flavoring to coat them.

The known prior art does not disclose the composition of the invention herein. Furthermore the prior art does not bring together the complex reasons and motives of the defined obese person, who may be suffering from simple obesity or may be both obese and diabetic, for remaining in that dangerous to a full life condition. Briefly it has been discovered that the obese person can be aided to achieve the reduced caloric intake by nutritionally supporting his or her basic physiological need for carbohydrates as well as offsetting the symptoms of hypoglycemia by supplying proper amounts of glucose and/or fructose, for example with invert sugar, to be consumed at designated time intervals; also dietary proteins and yeast and B Vitamins may be provided as needed, usually desirable in most cases.

OBJECTS OF THE INVENTION

An object of this invention is to supply a nutritional composition that will eliminate the desire for high caloric foods by elevating blood sugar, one of the most important factors in alleviating hunger.

A further object of the invention is the provision of a nutritional product which is adapted for preparation in a variety of potencies both in carbohydrate and protein content so as to support the carbohydrate and protein requirements of diabetic mellitus subjects, obese or non-obese, and obese non-diabetic subject.

Another object of this invention to provide a dietary nutritional composition that will aid a diabetic individual or a non-diabetic, obese individual to achieve a diet demanding a reduced caloric intake by nutritionally supporting his or her basic physiological need for carbohydrate by supplying a predetermined amount of sucrose and invert sugar to be consumed at proper intervals to offset the symptoms of hypoglycemia.

A still further object of this invention is to provide a nutritional product with an ample amount of 'B-complex' vitamins to allow utilization of glucose by the central nervous system.

Another further object of this invention is to supply a nutritional product with an ample amount of B-complex vitamins to restore tissue concentrations which were expelled and depleted by the cells in the absence of glucose and to provide for the increased utilization as carbohydrates are metabolized.

Still another further object of this invention is to supply a nutritional composition with ample thiamine to eliminate any deficiency in the gastrointestinal tract. Some of the symptoms caused by a deficiency are indigestion, severe constipation, anorexia, and gastric atony.

Yet another object of this invention to provide a dietary nutritional composition that assures the diabetic mellitus individual a premeasured and controlled intake of sugar supporting basic physiological need for carbohydrates.

Still another object of this invention is to provide a dietary nutritional product with a premeasured amount of carbohydrate allowing the diabetic individual to correct any error in daily carbohydrate intake caused by miscalculation in weighing or in evaluating the carbohydrate content of foodstuffs.

An additional object of this invention is to allow a premeasured carbohydrate intake in powder or liquid form for a diabetic individual when he is physically unable to consume all of the solid food prescribed on his diet.

Another additional object of this invention to allow a premeasured carbohydrate replacement for foods left uneaten on a plate while maintaining the prescribed insulin or oral hypoglycemic agent dosage calculated for the entire meal.

A further additional object of this invention is a nutritional composition containing a premeasured amount of carbohydrate to be used as a safeguard against the occurrence of hypoglycemia when a diabetic individual is late for a meal, forced to miss a meal, or experiences an excess of physical exercise.

Yet a further additional object of this invention to have available to an alert diabetic individual is a premeasured amount of carbohydrate for use in emergency situations when the diabetic has consumed an inappropriate dose of insulin. (Experts recommend that three (3) to four (4) grams of carbohydrate be given every ten of fifteen minutes until all signs of hypoglycemia disappear.)

An additional object of this invention is to have available for the alert diabetic child or adult a nutritional composition of premeasured carbohydrate in a convenient, usable form that can be carried with him to school, for play, on trips, during recreational activities, etc., to offset an unexpected insulin reaction.

Other objects of the invention will become evident in the course of the detailed description and discussion of the invention.

SUMMARY OF THE INVENTION

The invention comprises a nutrition composition suitable for humans, which composition consists essentially of: about 5–90% of sugar that can be hydrolyzed to a mixture of hexose sugars, which mixture includes glucose, fructose, or both; about 5–90% of sugar selected from the class consisting of glucose, fructose, mixtures of glucose and at least one other aldohexose or hexulose, and mixtures of fructose and at least one other hexulose or aldohexose; about 0.5–60% of dietary protein that provides at least the essential amino acids; and about 0.5–10 weight percent of edible yeast, where all of aforesaid components are in weight percent and the sum of these totals to 100 weight percent. Optionally at least on B Vitamin is also present. Desirably, at least the amount needed to support the health of an obese and/or diabetic human is present of the following B Vitamins: Niacin, Niacinamide, d-Pantothenic acid salts, Pyroxidoxine, Riboflavin, and Thiamine salts.

Customarily the hydrolyzable sugar is sucrose, maltose, lactose, gentiobiose, dextran, glycogen, or a mixture of two or more of these. Preferably this sugar is sucrose or brown sugar.

Customarily the hexose sugars used in the invention are afforded by invert sugar, honey, or molasses. However, pure, and relatively high purity glucose, fructose, or mixtures of these may be used. Glucose is preferred.

The dietary protein used in this invention does not include edible yeast, which is treated as a distinct component of the invention. Customarily the dietary protein is derived from egg, milk, or oil seed. Particular proteins are soya protein, milk protein, and milk protein derivatives, such as calcium caseinate.

Other compositions of the invention fall within the component ranges set forth in the following Table 1, in weight percent:

| Component | Composition | Composition | Composition |
| --- | --- | --- | --- |
| Hydrolyzable sugar: | 10–60 | 14–60 | 25–50 |
| Hexose sugar: | 10–75 | 10–65 | 18–40 |
| Dietary protein: | 8–60 | 8–58 | 15–40 |
| Edible yeast: | 3–10 | 5–10 | 6–9 |

Another nutrition composition of the invention consists essentially of about 60–80 weight percent of the aforesaid hexose sugar and about 20–40 weight percent of the aforesaid dietary protein, with the sum of these two components totalling 100 weight percent. Optionally one or more B Vitamin are present, as are optionally present in the aforedescribed 4-component composition of the invention.

The method of preparing a composition of the invention comprises: mixing the composition requirements of hydrolyzable sugar, dietary protein, and hexose sugar to obtain a mix capable of passing a fine wire mesh screen, for example, 12–14 mesh; forming a wet mass from said mix and drying the wet mass to obtain a uniform granular solid mix. Mixing the granular solid mix and edible yeast and forming this into a tablet or wafer form of the proper size and shape. When B Vitamins, or other vitamins, minerals, such as potassium, are desired integral part of this composition, these are mixed and then combined with the first uniform mix and the yeast before forming the tablet or wafer.

An aid in the forming of the tablet may be present. A typical aid is the finely divided silica material known as Syloid. A lubricant which can also function as a binder may also be present, such as stearic acid. Other potable materials may be used as binders (excipients). The Syloid when used is generally present in about 1 weight percent and the lubricant is generally present in about 2–3 weight percent—based on the aforesaid nutritional components as 100 weight percent.

When preparing a tablet or wafer of the composition which contains only the hexose sugar and dietary protein, the method is essentially as above except as modified by the change in components.

It is to be understood that the composition of the invention may be admixed with water or other potable liquid and ingested in liquid form, rather than in solid form. In some instances other nutritional or inert materials may also be present in either the liquid form or the solid tablet, wafer, or granulated form.

DESCRIPTION AND EXAMPLES OF THE INVENTION

The term 'hydrolyzable sugar' is intended to mean a sugar or sugars that can be hydrolyzed (inverted) by means well known to the sugar art to a mixture of hexose sugars. Hexose sugars herein include the aldohexoses and hexuloses. The mixture of hexose sugars includes gluclose or fructose or both. To illustrate: sucrose inverts to approximately an equal mixture of glucose and fructose. Corn starch hydrolyzes to a mixture of glucose, maltose, and dextrins to form corn syrup. Maltose and dextrins can be further hydrolyzed to glucose containing material. Glycogen, the form in which the human liver stores glucose, can be hydrolyzed to essentially pure glucose. Lactose and gentiobiose also hydrolyze to a mixture including glucose. Sucrose (white sugar) and brown sugar are a preferred source of this sugar.

Glucose has long been recognized as a stress relieving sugar. Fructose is now recognized as having this capability to much the same degree (Benefits of Dietary Fructose in Alleviating the Human Stress Response, J. Daniel Palm, Physiological Effects of Food Carbohydrates, ACS Symposium Series No. 15, 1975).

The invention utilizes hexose sugar selected from the class consisting of glucose, fructose, mixtures of glucose and at least one other aldohexose or hexulose, and mixtures of fructose and at least one other hexulose or aldohexose. Particularly of interest is invert sugar, which is about 50:50 glucose and fructose obtained by inverting sucrose solution. Honey is an excellent source of glucose; the low liquid forms such as dried honey or crystallized honey are preferred. Molasses is a source of glucose; sucrose is also present and the glucose content can be increased by hydrolysis.

Illustrative aldohexoses are glucose, mannose, and galactose. Illustrative hexuloses are fructose, sorbose, and ribohexulose.

The term "dietary proteins" includes the animal and vegetable proteins which provide at least the essential amino acids, or are fortified to so provide. The essential amino acids are those which the human body cannot synthesize. Also included are the amino acids themselves and mixtures thereof, such as the socalled liquid predigested proteins which have recently become widely available.

Particularly preferred are the proteins derived from egg, milk, or oil seed. Illustrative are egg albumin; lactoalbumin, casein and its salts such as calcium caseinate, whey, and cheese; soya protein such as soya flour and soya curd.

For the purposes of this invention, "dietary protein" does not include edible yeast.

One aspect of the invention utilizes edible yeast as an essential component. The edible yeast includes "dead" yeast, dried yeast, and yeast extracts. The edible yeast are excellent sources of protein, vitamins- especially of the B Vitamins, and minerals.

B Vitamins are an essential ingredient of obesity and diabetic diets. However, these can be taken separately from the compositions containing the aforesaid components: hydrolyzable sugar, defined hexose, dietary protein, and yeast, or defined hexose and dietary protein, It is preferred that the B Vitamin or vitamins be a part of the composition of the invention. Therefore, at least one added B Vitamin is present (added is in the sense of in addition to any B Vitamin naturally present in the aforesaid defined components.)

In particular, it is preferred that the following B Vitamins be added: Niacin ($B_3$), Niacinamide ($B_3$), d-Pantothenic acid and its salts, such as calcium and ammonium ($B_5$), Pyroxidoxine ($B_6$), Riboflavin ($B_2$), and Thiamine and its salts ($B_1$). These are added in at least the amount needed to support health of the obese and/or diabetic person.

In addition to the above pointed out essential and optional components, the composition of the invention may include other Vitamins, minerals, such as potassium affording compound, and other ingredients thought to be or known to be needful for human health.

BRIEF DESCRIPTION OF THE DRAWING

The drawing is a block schematic presentation of one manner of manufacture of a composition of the invention.

Now referring to the drawing, one embodiment of the method of the invention is illustrated.

In carrying out the method of this invention, the raw materials, typically consist of sucrose or brown sugar, soya protein (such as Promine D) (or protein derived from milk), and invert sugar, are measured, weighed, and screened into a blender through a number 3 screen with a 12-14 mesh size. The size of particles is designated by microns or mesh. A micron is 0.001 mm. Mesh refers to the number of screen openings per lineal inch. The openings also depend upon the wire size used in making the mesh material.

After passing through a 12, 13, or 14 mesh size screen. The raw material is mixed thoroughly in a blender. In accordance with the process claimed, the blended material is wetted down with sufficient purified, distilled water to form a wet granulated product which is then dried in an oven.

A second separate mixture of vitamins is measured, weighed, and milled through a suitable screen, such as a 12 to 14 mesh screen, into a blender. This mixture of vitamins may comprise the following ingredients for a 500,000 tablet mix.

| | |
|---|---|
| Calcium d-Pantothenate | 2.080 kg. |
| Vitamin B-12 | 0.208 kg. |
| Niacin | 4.500 kg. |
| Niacinamide | 4.500 kg. |
| Thiamine Mononitrate | 2.250 kg. |
| Riboflavin | 3.000 kg. |
| Pyridoxine | 1.240 kg. |

A third mixture is measured out comprising of yeast, a suitable lubricant, such as 10.00 kg. of stearic acid, is added to the blender and is thoroughly blended to achieve proper flow characteristics.

The three mixtures are combined in a suitable blender and then blended and milled through a suitable screen.

The blended, milled, and screened combination of the three mixtures is then blended again prior to the compression of the final mixture into suitable tablets, wafers, or can be packaged in a suitable container in a powder form.

In carrying out the method of this invention for preparing the two essential component composition the illustrative raw materials are dried honey and soya protein. These are measured, weighed, and screened into a blender. A given mixture to create approximately 500,000 tablets contains the following:

| | |
|---|---|
| Dried Honey | 404.350 Kg. (72.9%) |
| Soya Protein (Promine D) | 150.000 Kg. (27.1%) |

The raw materials are mixed thoroughly in a blender. The blended material is wetted down with sufficient purified, distilled water to form a wet granulated product which is then dried in an oven.

A second separate mixture of vitamins is measured, weighed, and milled through a suitable screen, such as a 12 to 14 mesh screen, into a blender. This mixture of B vitamins consists for a 500,000 tablet mix.

| | kg. |
|---|---|
| Calcium d-Pantothenate | 2.080 |
| Vitamin B-12 | 0.208 |
| Niacin | 4.500 |
| Niacinamide | 4.500 |
| Thiamine Mononitrate | 2.250 |
| Riboflavin | 3.000 |
| Pyridoxine | 1.240 |

The two mixtures are combined in a suitable blender and then blened and milled through a suitable screen.

A suitable lubricant, such as 10.00 kg. of stearic acid, is added to the blend of the two mixtures to achieve proper flow of characteristics during the milling operation.

The blended, milled, and screened combination of the two mixtures is then blended again prior to the compression of this final mixture into suitable tablets or wafers.

The above described final mixture results in substantially a 500,000 quantity of tablets of approximately 1,168 milligram weight, plus or minus 3 percent. Each tablet contains substantially the following, in mg. except stearic acid.

| | |
|---|---|
| Calcium d-Pantothenate | 3.75 |
| Vitamin B-12 | 3.75 |
| Niacin | 7.50 |
| Niacinamide | 7.50 |
| Thiamine Mononitrate | 1.50 |

-continued

| | |
|---|---|
| Riboflavin | 2.00 |
| Pyridoxine | 0.75 |
| Dried Honey | 800.00 |
| Soya Protein (Promine D) | 300.00 |
| Stearic Acid | 3% |

Illustrative compositions of the invention—four essential components—are presented hereinafter. It is to be understood that the weight percentage of the named components totals 100 weight percent.

30% to 43% sucrose, 18% to 30% invert sugar, from 20% to 34% protein (soy flour or milk derivative), yeast from 3% to 10%. In the most perferred form: sucrose 35% to 40%, invert sugar from 20% to 24%, protein (soy flour or milk derivative) 24% to 28%, and yeast from 8% to 9%. 40% to 60% sucrose, preferably 56% to 60%, invert sugar from 10% to 18%, preferably 10% to 14%, protein (soy flour or milk derivative) from 12% to 20%, preferably 14% to 18%, yeast from 3% to 10%, preferably 8% to 9%.

12% to 25% sucrose, preferably 17% to 21%, invert sugar from 30% to 60%, preferably 50% to 55%, protein (soy flour or milk derivative) from 12% to 20%, preferably 14% to 18%, yeast from 3% to 10%, preferably 8% to 9%.

Sucrose from 12% to 25%, preferably 17% to 21%, invert sugar from 10% to 18%, preferably 10% to 14%, protein (soy flour or milk derivative) from 35% to 60%, preferably 54% to 58%, yeast from 3% to 10%, preferably 8% to 9%.

Sucrose 10% to 20%, preferably 14% to 20%, invert sugar from 60% to 75%, preferably 60% to 65%, protein (soy flour or milk derivative) from 8% to 20%, preferably 8% to 12%, yeast from 3% to 10%, preferably 8% to 9%.

The products of the present invention may be prepared in dry form which may subsequently mixed with water or other acceptable liquid to make a liquid dispersion. The products may also be prepared by forming tablets or wafers to be swallowed or chewed.

EXAMPLE I

In practice of this invention, a given mixture to create approximately 500,000 tablets contains the following: raw materials:

| | kg. | |
|---|---|---|
| Sugar (sucrose) | 227.000 | (40.9%) |
| Soy Protein (or milk protein) | 150.000 | (27.1%) |
| Invert Sugar | 127.350 | (23.0%) |
| Yeast | 50.000 | (9.0%) |

Each tablet contains substantially the following with a tablet weight of approximately 1,168 milligram, plus or minus 3 percent.

| | PER TABLET |
|---|---|
| Sugar (sucrose) | 450.00 mg. |
| Soy Protein (or milk protein) | 300.00 mg. |
| Invert Sugar | 250.00 mg. |
| Yeast | 100.00 mg. |
| Calcium d-Pantothenate | 3.75 mg. |
| Vitamin B-12 | 3.75 mg. |
| Niacin | 7.50 mg. |
| Niacinamide | 7.50 mg. |
| Thiamine Mononitrate | 1.50 mg. |
| Riboflavin | 2.00 mg. |

-continued

| | PER TABLET |
|---|---|
| Pyridoxine | 0.75 mg. |
| Stearic Acid | 3% |

EXAMPLE II

In practice of this invention, a given mixture to create approximately 500,000 chewable wafers contains the following:

| | | |
|---|---|---|
| Invert Sugar | 1,750.000 kg. | (89.2%) |
| Sucrose | 187,500 kg. | (9.6%) |
| Soy Protein (or milk protein) | 12,500 kg. | (0.6%) |
| Yeast | 12,500 kg. | (0.6%) |

Each tablet contains substantially the following with a wafer weight of approximately 5 grams:

| | PER WAFER |
|---|---|
| Invert Sugar | 4,000. mg. |
| Sucrose (sugar) | 375. mg. |
| Soy Protein (or milk protein) | 25. mg. |
| Yeast | 25. mg. |
| Calcium d-Pantothenate | 3.75 mg. |
| Vitamin B-12 | 3.75 mg. |
| Niacin | 7.50 mg. |
| Niacinamide | 7.50 mg. |
| Thiamine Mononitrate | 1.50 mg. |
| Riboflavin | 2.00 mg. |
| Pyridoxine | 0.75 mg. |
| Stearic Acid | 3% |

EXAMPLE III

In practice of this invention, a given mixture to create approximately 500,000 chewable wafers contains the following:

| | | |
|---|---|---|
| Sugar (sucrose) | 1,750.000 kg. | (89.2%) |
| Invert Sugar | 187.500 kg. | (9.6%) |
| Soy Protein (or milk protein) | 12.500 kg. | (0.6%) |
| Yeast | 12.500 kg. | (0.6%) |

Each chewable wafer contains substantially the following with a wafer weight of approximately 5 grams:

| | PER WAFER |
|---|---|
| Sugar (sucrose) | 4,000. mg. |
| Invert Sugar | 375.mg. |
| Soy Protein (or milk protein) | 25. mg. |
| Yeast | 25. mg. |
| Calcium d-Pantothenate | 3.75 mg. |
| Vitamin B-12 | 3.75 mg. |
| Niacin | 7.50 mg. |
| Niacinamide | 7.50 mg. |
| Thiamine Mononitrate | 1.50 mg. |
| Riboflavin | 2.00 mg. |
| Pyridoxine | 0.75 mg. |
| Stearic Acid | 3% |

EXAMPLE IV

In practice of this invention, a given mixture to create approximately 500,000 tablets contains the following:

| | | |
|---|---|---|
| Sugar (sucrose) | 300.000 kg. | (40.8%) |
| Soy Protein (or milk protein) | 135.000 kg. | (18.4%) |
| Invert Sugar | 250.000 kg. | (34.0%) |
| Yeast | 50.000 kg. | (6.8%) |

Each tablet contains substantially the following with a tablet weight of approximately 1,168 milligram.

| | PER TABLET |
|---|---|
| Sugar (sucrose) | 600.00 mg. |
| Soy Protein (or milk protein) | 270.00 mg. |
| Invert Sugar | 500.00 mg. |
| Yeast | 100.00 mg. |
| Calcium d-Pantothenate | 3.75 mg. |
| Vitamin B-12 | 3.75 mg. |
| Niacin | 7.50 mg. |
| Niacinamide | 7.50 mg. |
| Thiamine Mononitrate | 1.50 mg. |
| Riboflavin | 2.00 mg. |
| Pyridoxine | 0.75 mg. |
| Stearic Acid | 3% |

EXAMPLE V

| | | |
|---|---|---|
| Sugar (sucrose) | 252.500 kg. | (45.9%) |
| Soy Protein (or milk protein) | 135.000 kg. | (24.5%) |
| Invert Sugar | 112.500 kg. | (20.5%) |
| Yeast | 50.000 kg. | (9.1%) |

Each tablet contains substantially the following with a tablet weight of approximately 1,168 milligram plus or minus 3 percent:

| | PER TABLET |
|---|---|
| Sugar (sucrose) | 505.00 mg. |
| Soy Protein (or milk protein) | 270.00 mg. |
| Invert Sugar | 225.00 mg. |
| Yeast | 100.00 mg. |
| Calcium d-Pantothenate | 3.75 mg. |
| Vitamin B-12 | 3.75 mg. |
| Niacin | 7.50 mg. |
| Niacinamide | 7.50 mg. |
| Thiamine Mononitrate | 1.50 mg. |
| Riboflavin | 2.00 mg. |
| Pyridoxine | 0.75 mg. |
| Stearic Acid | 3% |

EXAMPLE VI

| | | |
|---|---|---|
| Sugar (sucrose) | 180.00 kg. | (32.7%) |
| Soy Protein (or milk protein) | 135.00 kg. | (24.6%) |
| Invert Sugar | 185.00 kg. | (33.6%) |
| Yeast | 50.00 kg. | (09.1%) |

Each tablet contains substantially the following with a tablet weight of approximately 1,168 milligram plus or minus 3 percent:

| | PER TABLET |
|---|---|
| Sugar (sucrose) | 360.00 mg. |
| Soy Protein (or milk protein) | 270.00 mg. |
| Invert Sugar | 370.00 mg. |
| Yeast | 100.00 mg. |
| Calcium d-Pantothenate | 3.75 mg. |
| Vitamin B-12 | 3.75 mg. |
| Niacin | 750 mg. |
| Niacinamide | 7.50 mg. |
| Thiamine Mononitrate | 1.50 mg. |
| Riboflavin | 2.00 mg. |
| Pyridoxine | 0.75 mg. |
| Stearic Acid | 3% |

EXAMPLE VII

| | | |
|---|---|---|
| Sugar (sucrose) | 180.00 kg. | (32.7%) |
| Soy Protein (or milk protein) | 207.50 kg. | (37.7%) |
| Invert Sugar | 112.50 kg. | (20.5%) |
| Yeast | 50.00 kg. | (09.1%) |

Each tablet contains substantially the following with a tablet weight of approximately 1,168 milligram plus or minus 3 percent:

| | PER TABLET |
|---|---|
| Sugar (sucrose) | 360.00 mg. |
| Soy Protein (or milk protein) | 415.00 mg. |
| Invert Sugar | 225.0 mg. |
| Yeast | 100.00 mg. |
| Calcium d-Pantothenate | 3.75 mg. |
| Vitamin B-12 | 3.75 mg. |
| Niacin | 7.50 mg. |
| Niacinamide | 7.50 mg. |
| Thiamine Mononitrate | 1.50 mg. |
| Riboflavin | 2.00 mg. |
| Pyridoxine | 0.75 mg. |
| Stearic Acid | 3% |

EXAMPLE VIII

| | | |
|---|---|---|
| Sugar (sucrose) | 169.425 kg. | (30.8%) |
| Soy Protein (or milk protein) | 135.000 kg. | (24.6%) |
| Invert Sugar | 195.575 kg. | (35.5%) |
| Yeast | 50.000 kg. | (09.1%) |

Each tablet contains substantially the following with a tablet weight of approximately 1,168 milligram plus or minus 3 percent:

| | PER TABLET |
|---|---|
| Sugar (sucrose) | 338.85 mg. |
| Soy Protein (or milk protein) | 270.00 mg. |
| Invert Sugar | 391.15 mg. |
| Yeast | 100.00 mg. |
| Calcium d-Pantothenate | 3.75 mg. |
| Vitamin B-12 | 3.75 mg. |
| Niacin | 7.50 mg. |
| Niacinamide | 7.50 mg. |
| Thiamine Mononitrate | 1.50 mg. |
| Riboflavin | 2.00 mg. |
| Pyridoxine | 0.75 mg. |
| Stearic Acid | 3% |

There are many valid methods for arriving at the proper dietary prescription for a given patient. The following breakdown of the nutritional dietary supplement, it's objectives and use with the calculated diets are shown as examples only. The proper potency of the nutritional dietary supplement to be used for the individual obese person must be calculated by the doctor or nutritionist writing the individual diet.

The novelty of the nutritional dietary supplement is that it is available in a variety of potencies; i.e. high sucrose, moderate invert sugar, high invert sugar, moderate sucrose; high invert sugar, low sucrose, etc. with varied amounts of protein. The protein source depends on the physical ability of the obese person to assimilate it taking into consideration any secondary diseases that may be present; i.e. ulcers, diverticulitis, etc. The protein source may be soy (soybean) flour, milk proteins (casein, lactalbumin or whey) or lactalbumin from the white of egg. The vitamins may be increased or decreased in ratio with the increase and decrease of the sugar content. The modification of the vitamin content would be to insure adequate vitamins being available for oxidation of glucose, for use by the central nervous system, and for maintenance of the gastrointestinal tract. The yeast content can be increased and decreased as required to insure the proper B-Complex levels for assimilation of the glucose released upon assimilation of the protein.

Two invert-sugar protein tablets are taken ½ hour before each meal with a large glass of water (8 oz.). The two tablets supply 9.2 calories plus the following nutrients:

500 mg. Invert Sugar. This ingredient causes an immediate elevation of the blood sugar utilizing it's satiety value in decreasing the appetite.

900 mg. Sucrose. Each molecule of sucrose will be reduced to (1) glucose, and (2) fructose. The basic sugars released by digestion of sucrose prolong the satiety value of the invert sugar, thus extending the time that the appetite will be depressed.

7.50 mg. Calcium d-Pantothenate
7.50 mg. Vitamin B-12
15.00 mg. Niacin
15.00 mg. Niacinamide
3.00 mg. Thiamine Mononitrate
4.00 mg. Riboflavin
1.50 mg. Pyridoxine The above B vitamins are supplied (1) to restore tissue concentrations depleted by the hypoglycemic state that is associated with stress and obesity, (2) to provide the essential vitamins required in the oxidation of carbohydrates as they are metabolized, (3) to insure against a B-Complex deficiency in association with the secretion of insulin. The effectiveness of insulin appears to be influenced by the shortage of these factors.

600 mg. Protein. This ingredient has satiety effect and is a third stage release of glucose. Approximately 58% of all ingested protein will be converted to glucose by the body for utilization of energy. This action extends further the feeling of satiety and stabilization of the blood sugar.

100 mg. Yeast. This supplies (1) an additional source of protein, and (2) a secondary source of B-Complex vitamins that become available upon assimilation of the yeast to insure the oxidation of the glucose that is made available upon the breakdown of the protein.

One tablet should be taken with a full glass of water (8 oz.), mid-morning and mid-afternoon to insure against a dramatic drop in blood sugar that may be caused by the body's reaction to stress.

| SAMPLE 800 CALORIE DIET The amounts to be consumed are listed in food exchange lists | |
|---|---|
| TYPE OF FOOD | FOODS INCLUDED |
| Beverage | Carbonated beverages without sugar; Coffee; 480 gm. (1 pint) Fat free skim milk; tea |
| Bread | Yeast bread (white, whole wheat or rye). 12 gm (½ slice) |
| Dessert | Custards made with skim milk and egg allowance; fruit; diet gelatin desserts; all made without sugar |
| Fruit | Fresh or canned, cooked or frozen without sugar (amount equivalent to 37.5 gm. of carbohydrate for the day). |
| Meat, Egg or Cheese | 125 gm (4 ounces) of medium fat meat, fish, or fowl; i egg daily; cottage cheese. If desired cottage cheese may be exchanged for meat. |
| Soup | Bouillon, clear, fat-free broth; vegetable soups made from food allowance. |
| Vegetable | Any in amount equivalent to 12 gm. of carbohydrate for the day. |
| Miscellaneous | Herbs; mustard; small amount of salt; spices and vinegar |

| SAMPLE 1,200 Calorie Diet May be used with standard exchange list for carbohydrate foods | |
|---|---|
| TYPE OF FOOD | FOODS INCLUDED |
| Beverage | Carbonated beverage without sugar; coffee; 480 gm.(1 pint) of fat free skim milk or buttermilk; tea |
| Bread | Yeast bread (white-whole wheat or rye), 75 gm. (3 slices daily) |
| Cereal | 17 gm. of cereal (dry weight) may be exchanged for 25 gm. (1 slice) of bread |
| Dessert | Custards made from skim milk and egg allowance; fruit allowed (see fruit); gelatin desserts, all without sugar |
| Fat | 20 gm. (4 teaspoons) of butter or substitute daily |
| Fruit | Fresh or canned, cooked or frozen without sugar (amount equivalent to 37.5 gm. carbohydrate for the day) |
| Meat, egg of cheese | 150 gm. (5 ounces) of medium fat meat, fish or fowl; 1 egg daily; Cheddar (American) cheese; cottage cheese. If desired, cheese or eggs may be exchanged for meat |
| Soup | Bouillon; clear, fat free broth; vegetable soups made from food allowance |
| Vegetable | Any amount equivalent to 12 gm. of carbohydrate for the day |
| Miscellaneous | Herbs; mustard; salt; spices; vinegar |

These diets are used with the dietary nutritional supplement. 2 tablets taken with a full glass of water ½ hour before each meal. 1 tablet taken with a full glass of water mid-morning and mid-afternoon.

The composition of the nutritional dietary supplement can be adjusted to fit the requirements of a diabetic under a wide variety of circumstances.

An alert diabetic begins to experience an insulin reaction and his physical location at the time may have him removed from an immediate source of food or beverage. He may eat one or several chewable wafers as required to stop the reaction. The recommended chewable wafer or wafers that the diabetic is to consume will be high invert sugar (4 grams per wafer) for an immediate elevation of blood glucose with a dietary follow-up of sucrose. The wafer contains ample B vitamins for utilization of the sugar and maintains an ample supply for other body functions even while the diabetic is under stress.

High sucrose (4 grams per wafer) with a low level of glucose may be preferred for a diabetic who knows his meal will be delayed while driving between towns, in a business meeting, etc. This formula with it's small dose of invert sugar can given an immediate lift in blood sugar before it has a chance to drop and will be followed by the gradual conversion of sucrose to glucose and fructose. This available sugar is enhanced with ample B vitamins and protein to prolong the effect.

A diabetic child who plays too vigorously at school may only require a one gram tablet of mixed sucrose-invert sugar with the protein and B vitamins to stabilize his blood sugar until his next meal.

Thus having described the invention, what is claimed is:

1. The method of preparing a nutrition product, which method comprises the steps of:
   mixing first ingredients comprising approximately 450. milligrams of brown sugar with 300. milligrams of soya protein and 250. milligrams of invert sugar,
   blending said first ingredients until they pass through a 12 to 14 mesh screen,
   wetting said first ingredients to form a wet granulated material,
   drying said wet granulated material to form a dry granulated material,
   mixing second ingredients comprising approximately 3.75 milligrams of calcium d-pantothenate, approximately 7.50 milligrams of niacin, approximately 7.50 milligrams of niacinamide, approximately 1.50 milligrams of thiamine mononitrate, approximately 2.00 milligrams of riboflavin, and approximately 0.75 milligrams of pyridoxine,
   blending said second ingredients until they pass through a 12 to 14 mesh screen,
   mixing said dried first granulated material, said blended second ingredients and a third ingredient comprising approximately 100. milligrams of yeast and milling and screening said milled material through a 12 to 14 mesh screen, and
   forming said last mixture into tablet or wafer form.

2. The method of claim 1 including the step of:
   mixing approximately 3.75 milligrams of vitamin B-12 with said second ingredients.

3. The method of claim 1 wherein: divided silica lubricant is added to said yeast ingredient before it is blended in said last mixture.

4. The method of claim 3 wherein approximately two percent by weight of stearic acid binder-lubricant is added to said divided silica containing last mixture.

5. A tablet prepared in accordance with the method of claim 4.

6. The method of preparing a nutrition product comprising the steps of:
   mixing first ingredients comprising approximately 800. milligrams of dried honey with 300. milligrams of soya protein until they pass through a 12 to 14 mesh screen,
   wetting said first ingredients to form a wet granulated material,
   drying said first granulated material,
   mixing second ingredients comprising approximately 3.75 miiligrams of calcium d-pantothenate, approximately 7.50 milligrams of niacin, approximately 7.50 milligrams of niacinamide, approximately 1.50 milligrams of thiamine mononitrate, approximately 2.00 milligrams of riboflavin, and approximately 0.75 milligrams of pyridoxine until they pass through a 12 to 14 mesh screen,
   mixing said dried first granulated material and said blended second ingredients and milling and screening this mixture through a 12 to 14 mesh screen, and
   forming said last mixture into tablet or wafer form.

7. The method of claim 6 including the step of:
   mixing approximately 3.75 milligrams of vitamin B-12 with said second ingredients.

8. The method of claim 6 wherein:
   stearic acid binder-lubricant is added to the mixture of said dried granulated material and said blended second ingredients before they are blended into said last mixture.

9. A tablet prepared in accordance with the method of claim 8.

* * * * *